United States Patent
Kilcer et al.

(10) Patent No.: US 10,494,118 B1
(45) Date of Patent: Dec. 3, 2019

(54) WAYFINDING APPARATUS FOR AIRCRAFT

(71) Applicant: The Boeing Company, Chicago, IL (US)

(72) Inventors: Zachary J. Kilcer, Seattle, WA (US);
Paul Joseph Wilcynski, Seattle, WA (US); Lars Eric Blacken, Bothell, WA (US); David A Young, Bellingham, WA (US); William Hanson Valentine, Jr., Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/996,168

(22) Filed: Jun. 1, 2018

(51) Int. Cl.
| B64D 45/00 | (2006.01) |
| F21V 8/00 | (2006.01) |
| F21W 107/30 | (2018.01) |
| F21W 106/00 | (2018.01) |
| B60Q 3/62 | (2017.01) |

(52) U.S. Cl.
CPC .......... B64D 45/00 (2013.01); G02B 6/0055 (2013.01); *B60Q 3/62* (2017.02); *B64D 2045/007* (2013.01); *F21V 2200/20* (2015.01); *F21W 2106/00* (2018.01); *F21W 2107/30* (2018.01)

(58) Field of Classification Search
CPC ....... G09F 2013/1859; G09F 2013/049; B64D 47/02; B60Q 3/30
USPC ............................................. 40/547; 362/560
See application file for complete search history.

(56) References Cited

U.S. PATENT DOCUMENTS

| 4,574,336 | A | * | 3/1986 | Mikalonis | ................ | B60Q 3/43 362/151 |
| 5,441,326 | A | * | 8/1995 | Mikalonis | .......... | B60H 1/00371 105/325 |
| 7,665,874 | B2 | * | 2/2010 | Chadwell | ................ | G09F 13/04 362/559 |
| 7,722,237 | B2 | * | 5/2010 | Watson | ................... | G09F 13/04 362/154 |
| 8,534,892 | B2 | * | 9/2013 | Letourneau | ........ | G02B 27/0994 362/551 |
| 8,770,812 | B2 | * | 7/2014 | Kino | ...................... | B60Q 1/323 362/23.17 |
| 2005/0146893 | A1 | * | 7/2005 | Ford | ..................... | B60K 35/00 362/560 |
| 2006/0080873 | A1 | * | 4/2006 | Riopel | ................... | G02B 6/005 40/546 |
| 2013/0235608 | A1 | * | 9/2013 | Tsai | ...................... | G02B 6/0008 362/551 |
| 2017/0247111 | A1 | | 8/2017 | Valentine, Jr. | | |

* cited by examiner

*Primary Examiner* — Joanne Silbermann
(74) *Attorney, Agent, or Firm* — Hanley, Flight & Zimmerman, LLC

(57) ABSTRACT

Wayfinding apparatus for aircraft are disclosed. An example apparatus includes a wayfinding apparatus having a core composed of a light transmissive material. The core has a first surface defining a first face and a second surface defining a second face. The second face is oriented non-parallel relative to the first surface such that a second edge of the core is in a rearward direction relative to the first face. A transition is positioned between the first surface and the second surface. The transition is to optically couple the second edge and the first face.

20 Claims, 10 Drawing Sheets

WAYFINDING APPARATUS FOR AIRCRAFT

FIELD OF THE DISCLOSURE

This disclosure relates generally to aircraft and, more particularly, to wayfinding apparatus for aircraft.

BACKGROUND

A fuselage of an aircraft defines a cabin having numerous passenger seats for transporting passengers. The passenger seats are typically arranged in rows of seats. To identify the seats (e.g., to allow a passenger to find a particular seat), seat signs are often secured above or below overhead baggage bins that are located above one or more rows of the seats.

Figure 1:
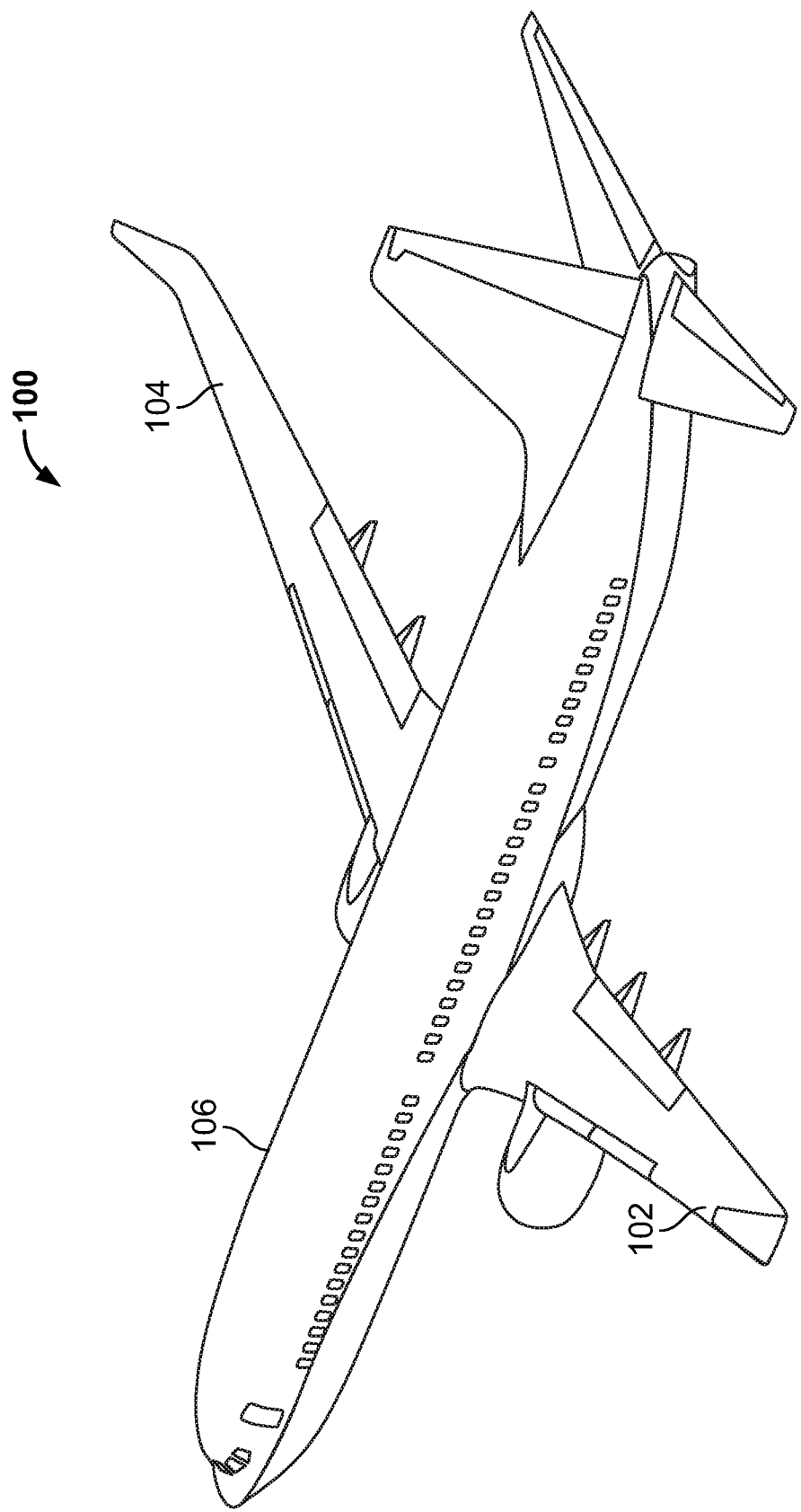
FIG. 1 is an example aircraft implemented with an example wayfinding apparatus in accordance with teachings of this disclosure.

Certain examples are shown in the above-identified figures and described in detail below. In describing these examples, like or identical reference numbers are used to identify the same or similar elements. The figures are not necessarily to scale and certain features and certain views of the figures can be shown exaggerated in scale or in schematic for clarity and/or conciseness. Additionally, several examples have been described throughout this specification. Any features from any example can be included with, a replacement for, or otherwise combined with other features from other examples. As used in this patent, stating that any part is in any way positioned on (e.g., located on, disposed on, formed on, coupled to, etc.) another part, means that the referenced part is either in contact with the other part, or that the referenced part is spaced from the other part with one or more intermediate part(s) located therebetween. Stating that any part is in contact with another part means that there is no intermediate part between the two parts.

SUMMARY

An example apparatus includes a wayfinding apparatus having a core composed of a light transmissive material. The core has a first surface defining a first face and a second surface defining a second face. The second face is oriented non-parallel relative to the first surface such that a second edge of the core is in a rearward direction relative to the first face. A transition is positioned between the first surface and the second surface. The transition is to optically couple the second edge and the first face.

An example apparatus includes a body defining an outer surface and an inner surface. The body having a first leg defining a face to present indicia and a second leg defining a light receiving edge oriented in a rearward direction relative to the face. The light receiving edge to receive light from a light source to illuminate the indicia of the face. A transition to couple the first leg and the second leg. The transition to direct light from the second leg to the first leg.

An example apparatus includes a rail having a first track and a second track. A diffusor has a first lip at a first edge of the diffusor and a second lip at a second edge of the diffusor. The first lip is to engage the first track and the second lip is to engage the second track to couple the diffusor to the rail. A stencil is coupled to a front surface of the diffusor. The stencil is positioned between the first lip and the second lip.

DETAILED DESCRIPTION

Aircraft passenger cabins typically include seat signs that are not illuminated (e.g., unlit). For example, a conventional seat sign of an aircraft includes a seat number printed on a flat plastic placard that is unlit. However, many passengers cannot notice the sign, or can find it difficult to discern seat numbers thereon, as they walk through an aisle of a vehicle trying to find their seats. Accordingly, a passenger boarding process can be extended and take longer than expected, which can delay departure of the aircraft. Thus, a typical seat sign often lacks readily discernable or even subtle visual clues that quickly and efficiently direct passengers to their assigned seats.

Example apparatus disclosed herein provide illuminated wayfinding apparatus. Specifically, the example wayfinding apparatus disclosed illuminate a graphic or indicia positioned or supported by a stowaway cabin associated with a respective seat or set of seats of the cabin to present wayfinding information to passengers of an aircraft or another multi-passenger vehicle. Example wayfinding apparatus disclosed herein include a body or frame having a front portion to display a graphic (e.g., a back lit or edge lit graphic) thereon. For example, the body (e.g., a portion or a corner of the body) has a curved or arcuate shape or profile defining an edge of the body to capture light from a light source (e.g., an LED). For example, emitted light captured by an edge of the wayfinding apparatus is routed or directed (e.g., around a corner defined by the curved edge) to illuminate a graphic visible to a passenger on the front portion that is spaced from the curved edge. In some such examples, wayfinding apparatus disclosed herein can be illuminated using a common light source (e.g., cross-bin lighting of an aircraft). To this end, an individual light (e.g., and associated wiring/circuitry) is not needed for each wayfinding apparatus. Instead, the wayfinding apparatus disclosed herein can be illuminated by existing light sources of an aircraft.

FIG. 1 is an example aircraft 100 implemented with an example wayfinding apparatus in accordance with teachings of this disclosure. The aircraft 100 is an example aircraft and, thus, the methods and apparatus disclosed herein can be implemented with other aircraft, or other vehicles without departing from the scope of this disclosure. For example, instead of an aircraft, examples disclosed herein can be used in various other vehicles, such as automobiles, buses, locomotives and train cars, watercraft, spacecraft, etc.

The aircraft 100 is a commercial aircraft having a first wing 102 and a second wing 104 extending from a fuselage 106. The fuselage 106 includes a cabin for transporting passengers. The cabin can include a cockpit, one or more work sections (for example, lavatories, galleys, personnel carry-on baggage areas, and the like), and/or one or more passenger sections (for example, first class, business class, cabins, and coach sections, expanded economy section, and/or the like). Each of the sections can be separated by a cabin transition area, which can include one or more class divider assemblies (e.g., between aisles). Overhead stowage bin assemblies can be positioned throughout the cabin.

Figure 2:
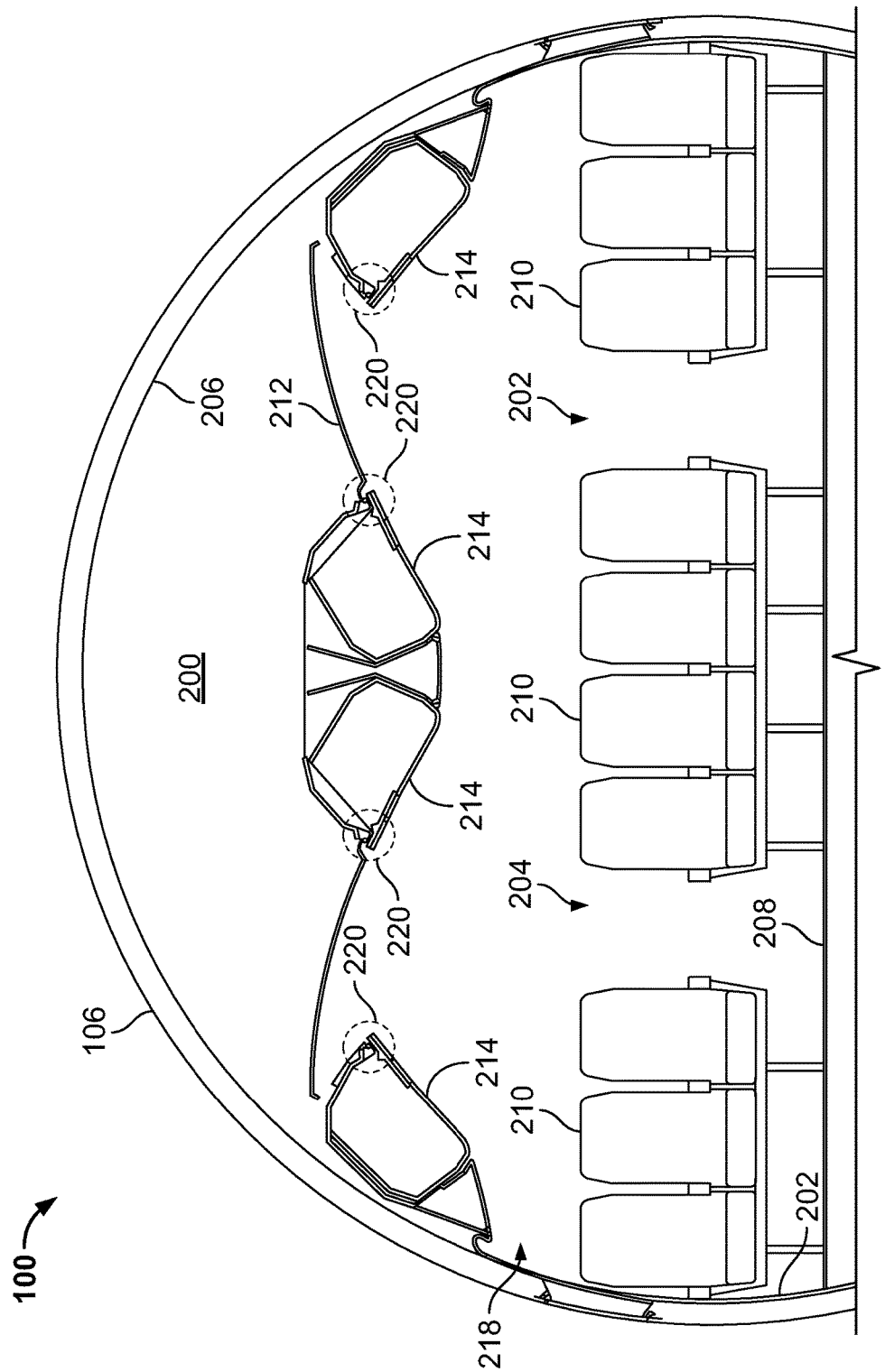
FIG. 2 is a partial, front view of a cabin of the example aircraft of FIG. 1.

FIG. 2 is a partial, front view of a cabin 200 of the aircraft 100 of FIG. 1. The cabin 200 is within the fuselage 106 of the aircraft 100. As shown in FIG. 2, the cabin 200 includes two aisles 202 and 204 that extend between a fore section and aft section of the cabin 200. In some examples, the cabin 200 can have more or fewer aisles than shown. For example, the cabin 200 can include a single aisle that extends through the center of the cabin 200 that extends between the fore and aft sections. The cabin 200 is defined by a wall 206 and a floor 208 of the fuselage 106. The floor 208 supports seats 210 and a ceiling 212 supports overhead bins 214. The aisles 202 and 204 separate the seats 210 within a row 218. In some examples, the aircraft 100 includes numerous rows of seats within the cabin 200. Each of the overhead bins 214 (e.g., overhead stowage bins) includes a wayfinding apparatus 220 associated with (e.g., located on) the overhead bins 214 positioned above the seats 210 proximate to the aisles 202 and 204. The wayfinding apparatus 220 includes indicia associated with respective ones of the seats 210 to efficiently and intuitively direct passengers to their respective seat (e.g., assigned seat) during a boarding process.

Figure 3:
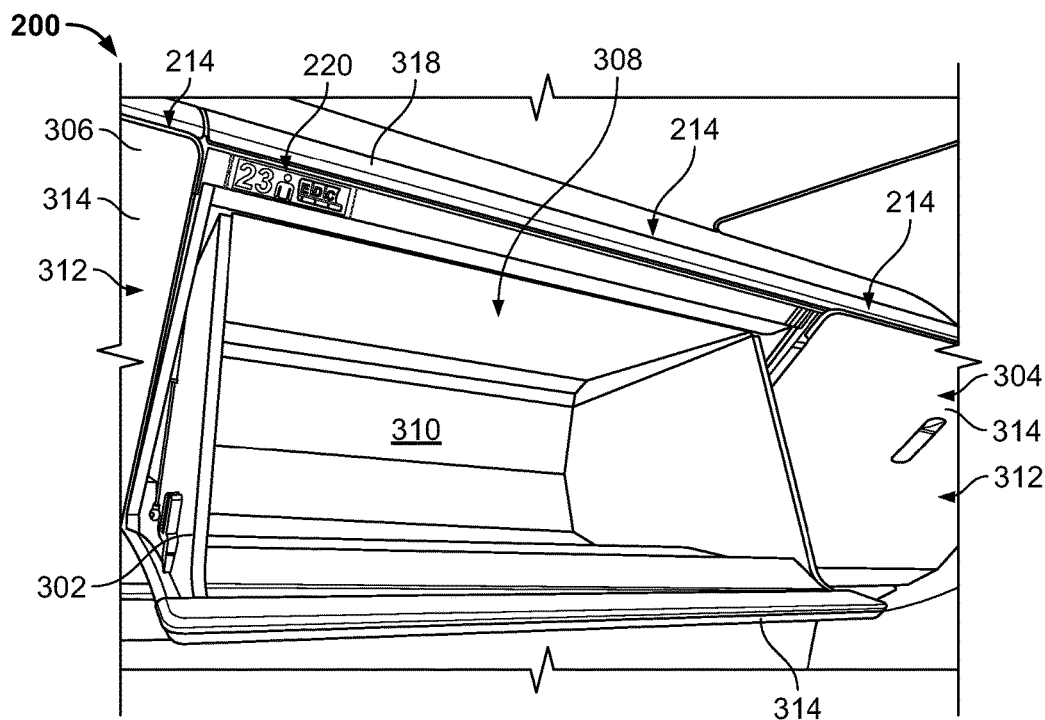
FIG. 3 is a partial, perspective view of the cabin of FIG. 2 showing example overhead bins of the example aircraft 100 of FIG. 1 and illustrating the example wayfinding apparatus.

FIG. 3 is a partial, perspective view of the cabin 200 showing the overhead bins 214 of the aircraft 100 of FIG. 1. Specifically, FIG. 3 illustrates a first overhead bin 302 positioned between a second overhead bin 304 and a third overhead bin 306. The first overhead bin 302 is shown in an open position 308 to provides access to a storage area 310 (e.g., a cavity) of the first overhead bin 302. The second overhead bin 304 and the third overhead bin 306 are each shown in a closed position 312 to prevent access to respective storage areas of the second overhead bin 304 and the third overhead bin 306. To move the overhead bins 214 between the open position 308 and the closed position 312, each of the overhead bins 214 includes a door 314.

To enable passengers to find a particular seat in the cabin 200, each of the overhead bins 214 includes an example wayfinding apparatus 220 disclosed herein. In the illustrated example, the wayfinding apparatus 220 of the first overhead bin 302 is associated with a partial section or row of seats 210 (e.g., row 23, seats A, B and C) that are associated with the first overhead bin 302 (e.g., directly below the first overhead bin 302). As shown in FIG. 3, the wayfinding apparatus 220 is visible when the first overhead bin 302 is in the open position 308. To this end, the respective wayfinding apparatus of the overhead bins 214 are not visible when the overhead bins 214 are in the closed positions 312. For example, in the closed position 312, the door 314 of the second overhead bin 304 covers (e.g., hides from view) the wayfinding apparatus 220 associated with the second overhead bin 304.

Prior to boarding, the overhead bins 214 can be positioned in open positions to expose (e.g., illuminate) the wayfinding apparatus 220 and enable boarding passengers to locate their seats. As boarding passengers locate their seats identified by the wayfinding apparatus 220 associated with the overhead bins 214, the door 314 of the overhead bin 214 can be moved to the closed position to cover the wayfinding apparatus 220. To facilitate locating the wayfinding apparatus 220, the wayfinding apparatus 220 is illuminated via a light source positioned behind a panel or cover 318 of the overhead bins 214. The light source is not directly visible by passengers within the cabin 200. Instead, the light source is hidden by the cover 318. The light source can be cross-bin lighting.

Figure 4:
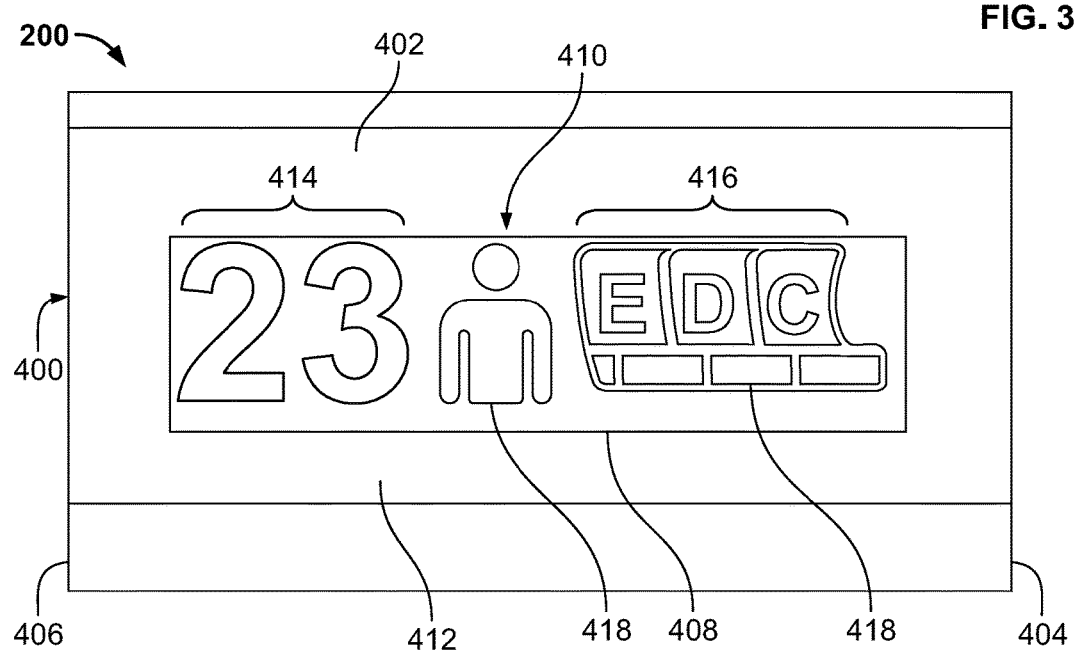
FIG. 4 is a front view of the example wayfinding apparatus of FIGS. 2 and 3.

FIG. 4 is a front view of the example wayfinding apparatus 220 of FIGS. 2 and 3. The wayfinding apparatus 220 includes a body 400 defining a face 402 (e.g., a front surface or face) between a first side 404 of the body 400 and a second side 406 of the body 400 opposite the first side 404. The face 402 defines a display 408 to present indicia 410 (e.g., visual indicators). The display 408 is composed of a transparent or light transmissive material(s) (e.g., acrylic). The indicia 410 are formed from a translucent material (e.g., a material having less transmissivity relative to the transparent material of the display 408 surrounding the indicia 410). For example, the indicia 410 can be composed of a material that provides a frosted appearance to the indicia 410 when compared to the transparent material of the display 408 surrounding the indicia 410. A portion 412 (e.g., a non-transmissive portion) of the face 402 surrounding a perimeter of the indicia 410 and/or the display 408 is composed of an opaque or non-transmissive material(s). Thus, when the wayfinding apparatus 220 is illuminated, only the display 408 of the face 402 emits light (e.g., is illuminated) and the light emitting through the display 408 illuminates a perimeter or outline of the indicia 410 (e.g., the opaque material). Light does not emit from the portion 412 of the face 402 surrounding the perimeter of the indicia 410 and/or the display 408. Alternatively, the portion 412 can illuminate with significantly less intensity (e.g., lumens) than an intensity (e.g., lumens) of the display 408 and/or the indicia 410).

The wayfinding apparatus 220 can present numeric indicia, alphabetic indicia, symbols, and/or any other indicia. For example, the face 402 and/or the display 408 has alpha numeric indicia including a row identifier 414 (e.g., row 23) and seat identifiers 416 to identify the seats 210 associated with the row identifier 414 (e.g., seats C, D and E of row 23). In the illustrated example, the indicia include symbols 418 in conjunction with the indicia corresponding to the row identifier 414 and the seat identifier 416. The indicia 410 include a symbol (e.g., a silhouette of a person) that separates the row identifier 414 (e.g., numbers) and the seat identifiers 416 (e.g., letters) positioned in silhouettes of seats (e.g., symbols). In some examples, the display 408 can be configured to present indicia having letter(s), text, symbols, and/or any other indicia, other language characters (e.g., Greek characters, Chinese characters or other logograms), and/or any combination thereof, and/or any other indicia associated with, or used to identify, a location of the seats. The wayfinding apparatus 220 displays the indicia in a landscape orientation. In some examples, the wayfinding apparatus 220 can be configured to display the indicia in a portrait orientation, a combination of portrait and landscape orientations, and/or any other suitable orientation(s).

Figure 5:
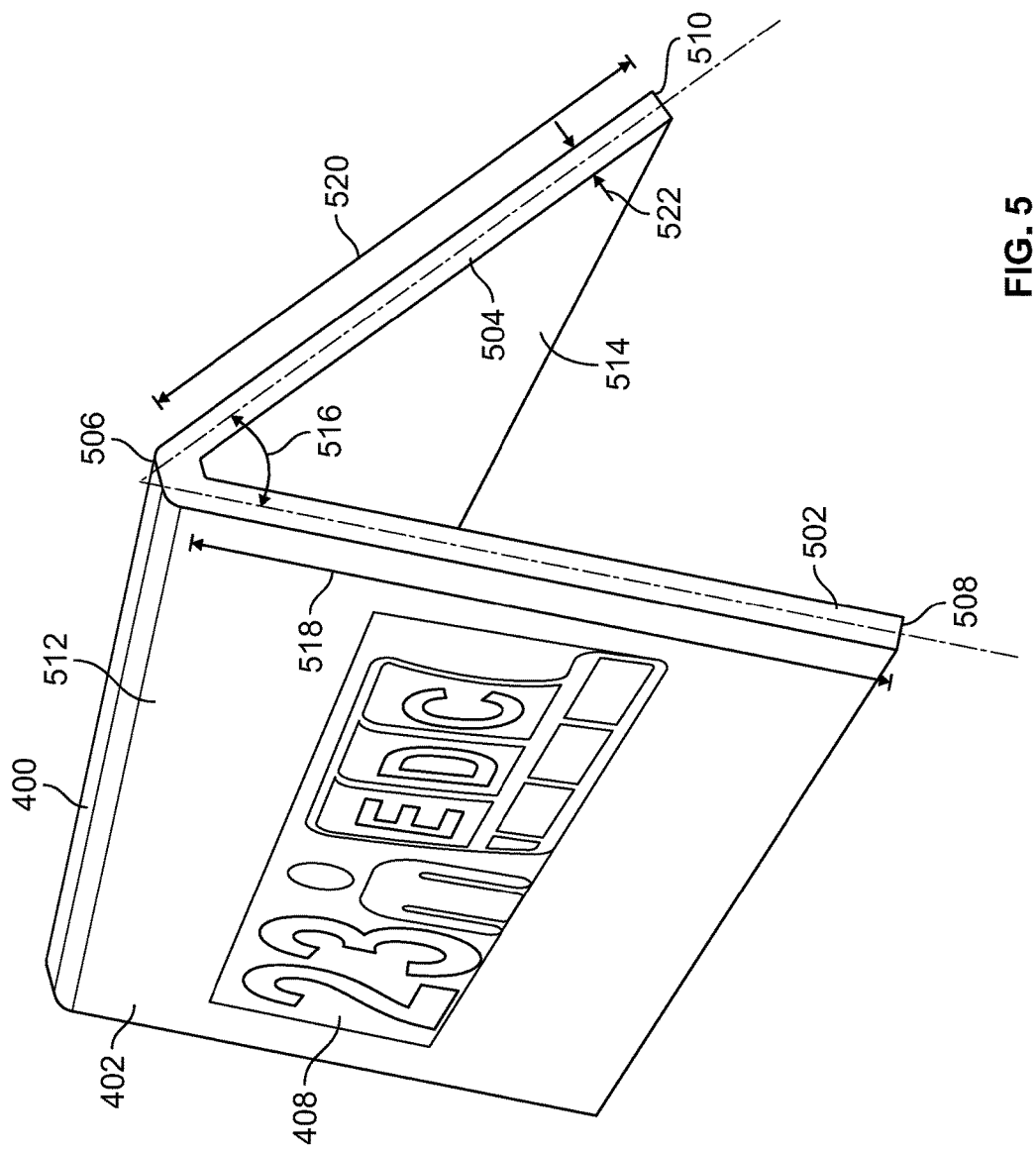
FIG. 5 is a side, perspective view of the example wayfinding apparatus of FIG. 4.

FIG. 5 is a side, perspective view of the example wayfinding apparatus of FIG. 4. The body 400 of the wayfinding apparatus 220 defines a first leg 502, a second leg 504 and a transition 506 (e.g., a curved edge) that couples the first leg 502 and the second leg 504. The first leg 502 defines a first edge 508 and the second leg 504 defines a light receiving edge 510. The body 400 defines an outer surface 512 and an inner surface 514 opposite the outer surface 512. The outer surface 512 of the first leg 502 defines the face 402 and the display 408.

Each of the first leg 502 and the second leg 504 has a rectangular profile or shape. The transition 506 is a curved portion that couples the first leg 502 and the second leg 504. The first leg 502, the second leg 504 and the transition 506 are a unitary piece or structure such that the body 400 defines a V-shaped cross-sectional shape or profile to enable the body 400 to couple or be positioned adjacent or relative to an edge of the overhead bin 214. The transition 506 defines an angle 516 between the first leg 502 (e.g., a centerline or longitudinal axis of the first leg 502) and the second leg 504 (e.g., a centerline or longitudinal axis of the second leg 504). For example, the angle 516 can be between approximately 10 degrees and 30 degrees. In some examples, the angle 516 is approximately 20 degrees. In the illustrated example, a length along a longitudinal axis 518 of the first leg 502 is longer (e.g., slightly larger) than a length along a longitudinal axis 520 of the second leg 504. For example, the length of the first leg 502 is between approximately 5 percent and 10 percent longer than the length of the second leg 504 to enable the display 408 (e.g., the indicia 410) to be positioned at a desired angle relative to the cover 318. For example, the first leg 502 can be positioned parallel relative to the cover 318 of the overhead bin 214. In some examples, the length of the first leg 502 is approximately between 1 inch and 2 inches (e.g., 1.5 inches) and the length of the second leg 504 is approximately between 1 inch and 2 inches (e.g., 1.5 inches). However, in some examples, the length of the first leg 502 is substantially the same or identical than the length of the second leg 504. In some examples, the length of the first leg 502 can be less than or greater than the length of the second leg 504. Additionally, the body 400 has a thickness 522 of between approximately one-quarter of an inch and three-quarters of an inch to improve illumination of the display 408 (e.g., light guide and/or light pipe characteristics).

Figure 6:
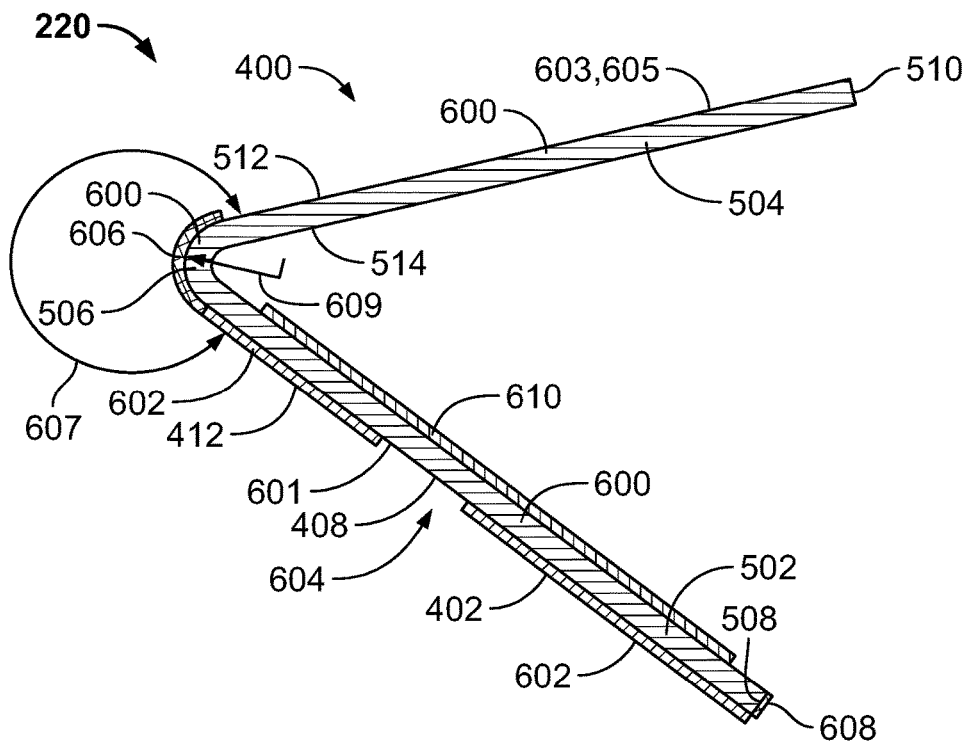
FIG. 6 is a cross-sectional view of the wayfinding apparatus of FIGS. 2-5.

FIG. 6 is a cross-sectional view of the wayfinding apparatus 220 of FIGS. 2-5. The body 400 includes a core 600 defining the first leg 502, the second leg 504 and the transition 506. The core 600 distributes or transports light between the light receiving edge 510 and the display 408. To improve transmission or propagation of light to a different location or distribute light along a path, the core 600 (e.g., light pipe or light guide) is configured (e.g., via a material, index of refraction of a material, and/or a dimensional characteristic of the core 600) to provide total internal reflection (TIR) optics. The core 600 includes an optically transmissive material via which light is transmitted from the light receiving edge 510 to the display 408. Thus, the core 600 is composed of a light transmissive material(s) (e.g., a translucent material). For example, the core 600 is composed of a plastic material such as, for example, an acrylic material. The core 600 defines a first surface 601 defining the face 402 and the first edge 508, and a second surface 603 defining a second face 605 and the light receiving edge 510 (e.g., a second edge). The second surface 603 is oriented non-parallel relative to the first surface 601 such that the light receiving edge 510 faces in a rearward direction relative to the first surface 601 to enable the light receiving edge 510 to be oriented toward a light to receive light from a light source. The transition 506 is positioned between the first surface 601 and the second surface 603 to optically couple the light receiving edge 510 and the first edge 508. The transition 506 is an arcuate surface to enable the body 400 or the wayfinding apparatus 200 to wrap around the cover 318. In this manner, the face 402 can be positioned (e.g., parallel) relative to the cover 318 and the second face 605 projects toward a light source positioned behind the cover 318. For example, the transition 506 defines a corner (e.g., a curved corner) of the core 600. The first surface 601 and the second surface 603 are spaced by an angle 607 of approximately between 280 and 330 degrees. For example, the outer surface 512 of the transition 506 can have a radius of curvature 609 between approximately 0.375 inches and 0.5 inches.

To define the portion 412 (e.g., the non-transmissive portion) of the face 402, the body 400 includes a mask 602. For example, the mask 602 is positioned on the face 402 and surrounds the display 408 of the face 402. In other words, the mask 602 is not positioned on or over the display 408. In other words, the display 408 is exposed and/or visible from the face 402. Thus, the mask 602 includes a cut-out or gap 604 to expose the display 408 defined by the face 402. The mask 602 prevents or restricts light from emitting from the core 600 through the portion 412 of the face 402. Thus, the mask 602 is positioned or coupled to the outer surface 512 of the first leg 502 defining the face 402 of the wayfinding apparatus 220.

To direct or reflect light from the light receiving edge 510 of the second leg 504 through the transition 506 to the core 600 of the first leg 502, the body 400 includes a reflective layer 606. Specifically, the reflective layer 606 is positioned or coupled to the outer surface 512 of the transition 506. Specifically, the reflective layer 606 is positioned between the first surface 601 and the second surface 603 and between the first side 404 and the second side 406. In particular, the reflective layer 606 covers or extends across an (e.g., an entire) arcuate surface defining the outer surface 512 of the transition 506. To this end, the reflective layer 606 is oriented toward the light receiving edge 510 and the first edge 508. The reflective layer 606 provides a mirroring effect to direct or channel the light from the second leg 504 towards the first leg 502. The reflective layer 606 can be, for example, mylar and/or any other suitable material(s) providing a mirroring effect to direct or channel the light. Additionally, to reflect light that passes through the core 600 to the first edge 508 of the first leg 502 towards the display 408, the body 400 includes a supplemental reflective layer 608. The supplemental reflective layer 608 is positioned or coupled to the first edge 508 of the first leg 502. The supplemental reflective layer 608 can be, for example, mylar and/or any other suitable material(s) providing a mirroring effect to direct or channel the light.

To diffuse or catch the light in the core 600 of the first leg 502 reflected from the reflective layer 606, the first leg 502 includes a frosted layer 610. The frosted layer 610 is positioned or coupled to the inner surface 514 of the first leg 502 opposite the outer surface 512 defining the face 402. Specifically, the frosted layer 610 is positioned adjacent the display 408. To this end, the frosted layer 610 directs or reflects light towards the display 408. In some examples, the frosted layer 610 can be implemented by a light diffuser.

The mask 602, the reflective layer 606 and/or the frosted layer 610 are coupled to the core 600 via adhesive, tape and/or any other fastener(s) or chemical(s). However, in some examples, the body 400 (e.g., the core 600, the mask 602, the reflective layer 606, the supplemental reflective layer 608 and/or the frosted layer 610) can be formed via additive manufacturing processes (e.g., 3-D printing). In some examples, the mask 602 and/or the frosted layer 610 can be formed by secondary processes (e.g., roughing the inner surface 514 and/or the outer surface 512 of the core 600 of the first leg 502). In some examples, the mask 602, the reflective layer 606, the supplemental reflective layer 608 and/or the frosted layer 610 can be applied to the core 600 via a sprayer (e.g., a nozzle). The mask 602, the reflective layer 606, the supplemental reflective layer 608 and/or the frosted layer 610 extend between the first side 404 and the second side 406 of the body 400.

The second leg 504 does not include a mask on the outer surface 512 or the inner surface 514. In some examples, as shown for example in FIG. 6A, the second leg 504 can include a mask 612 on the outer surface 512 of the second leg 504 and/or a mask 614 on the inner surface 514 of the second leg 504. The masks 612, 614 facilitate propagation or directing light from the light receiving edge 510 towards the transition 506, to the core 600 of the first leg 502. In some examples, the inner surface 514 of the transition 506 can include a mask 616.

Figure 7:
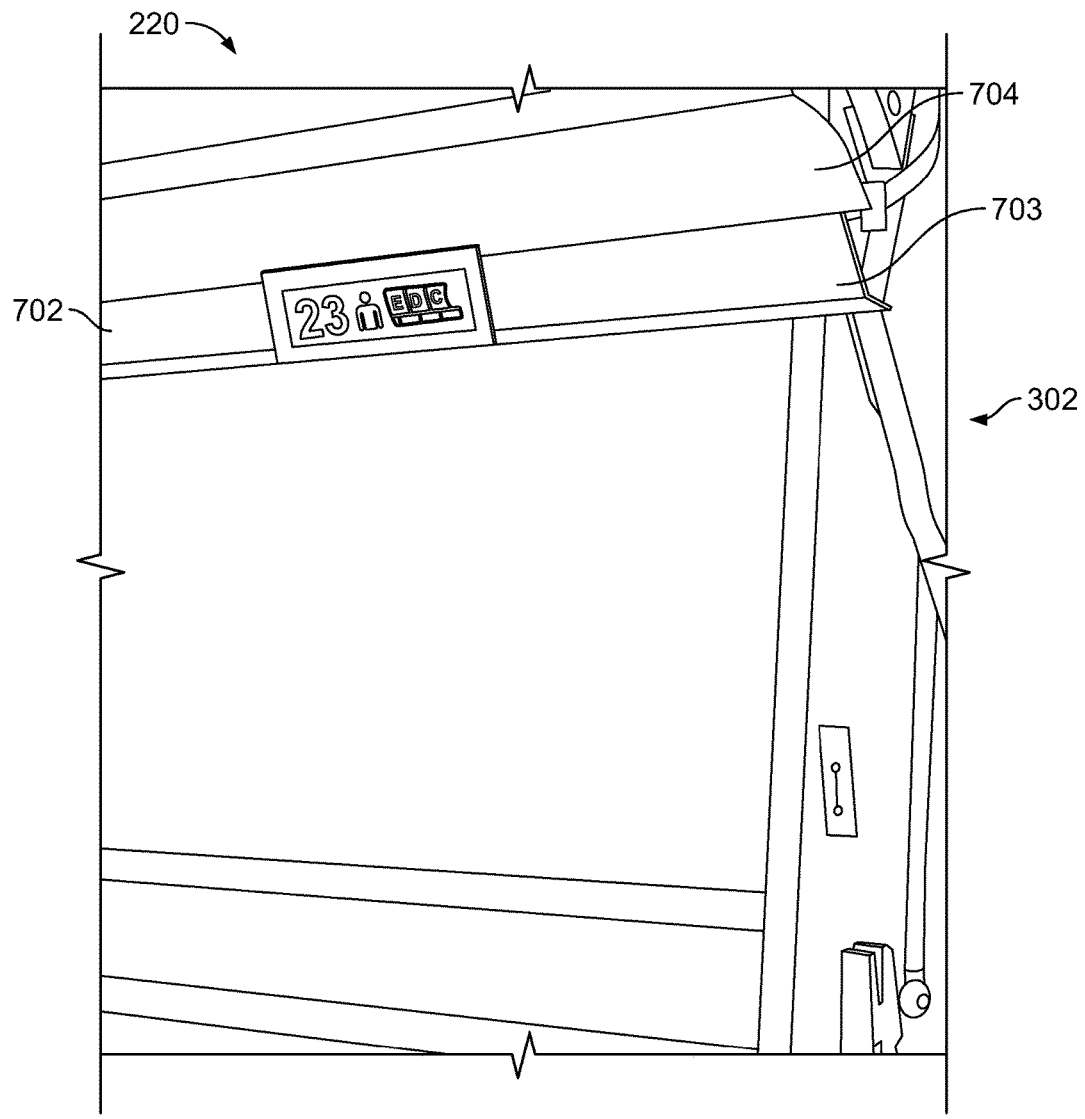
FIG. 7 is a partial, perspective view of the example overhead bin and the wayfinding apparatus of FIGS. 2-6.

FIG. 7 is a partial, perspective view of the first overhead bin 302 of FIG. 3. Specifically, the wayfinding apparatus 220 is coupled to a structure or support 702 (e.g., a frame) of the first overhead bin 302. The wayfinding apparatus 220 can be positioned at any location along (e.g., a longitudinal length of) an edge 703 of the first overhead bin 302. A light source 704 provides light to the wayfinding apparatus 220. The cover 318 of the first overhead bin 302 is removed for clarity. The light source 704 is positioned behind the support 702 and the light receiving edge 510 of the body 400. The light source 704 is cross-bin lighting. Thus, the light source 704 extends across a plurality of overhead bins (e.g., the first overhead bin 302, the second overhead bin 304, the third overhead bin 306, etc.). The light source 704 can be light emitting diodes (LEDs), a cross-aisle LED lighting assembly, a fluorescent light, etc. To this end, an individual light (e.g., and associated wiring/circuitry) is not needed for each wayfinding apparatus 220. Instead, the wayfinding apparatus 220 is illuminated by an existing light source of the aircraft 100.

Figure 8:
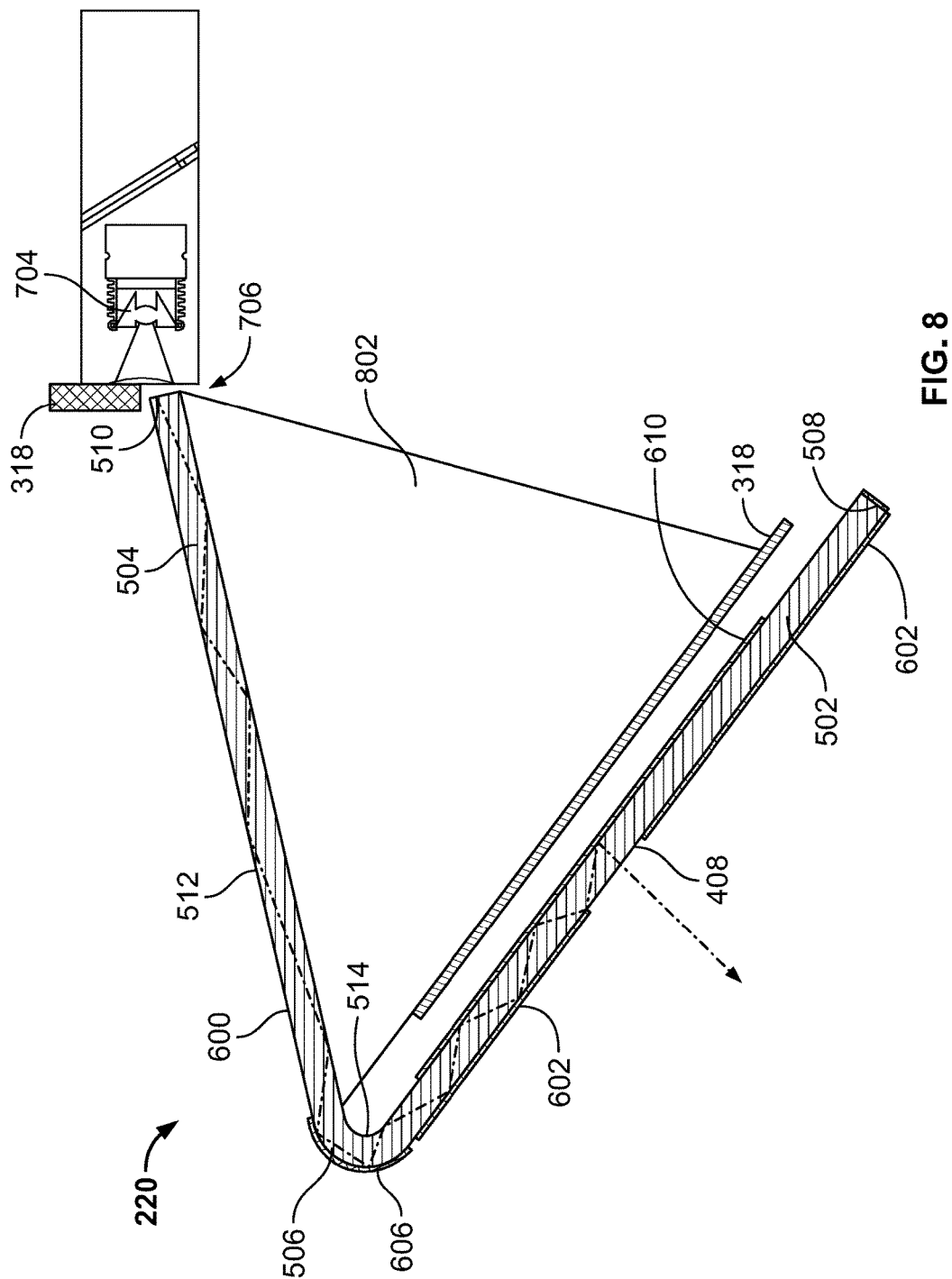
FIG. 8 is a schematic, side view of the wayfinding apparatus and the example overhead bin of FIGS. 2-7.

FIG. 8 is a schematic, side view of the wayfinding apparatus 220 and the first overhead bin 302 of FIGS. 2-7. To couple the wayfinding apparatus 220 to the first overhead bin 302, the wayfinding apparatus 220 includes a mounting block 802 (e.g., a support or bracket). The mounting block 802 is a wedge or has a triangular-shaped cross-section to facilitate mounting relative to the cover 318 and/or the overhead bin 214. The mounting block 802 couples to the second leg 504 via a fastener (e.g., a screw, a clip, adhesive, etc.) and couples to the cover 318. The wayfinding apparatus 220 is oriented at an angle such that light emitted from the light source 704 is reflected or propagated through the core 600 to illuminate the display 408 of the face 402. To illuminate the wayfinding apparatus 220, the light source 704 projects light to the light receiving edge 510 of the body 400. The light source 704 emits light through an opening or gap 706 formed between the cover 318 and the first overhead bin 302. The light receiving edge 510 receives and channels or directs the light in the core 600 of the second leg 504. Thus, the core 600 provides illumination where the source of the light is in a different location than an output of the light (i.e., at the display 408). The wayfinding apparatus 220 employs optical features to propagate light from the light source 704 and project the light outward orthogonally relative to the length of the first leg 502. The core 600 of the first leg 502, the second leg 504, and the transition 506, as well as the reflective layer 606, the mask 602 and the frosted layer 610 provide a total internal reflection (TIR) effect to improve propagation of light and/or distribution of light from the light receiving edge 510 to the display 408.

Employing a TIR effect to propagate light through the core 600 is dependent on a transmissibility of a material of the core 600 and an index of refraction of a material of the core 600. For example, the transmissibility factor relates to a degree of transparency and clarity of a material, and the refraction index is unique to each material and determines the extent to which light is refracted when entering or leaving the material. For example, transmissibility factor determines light transmission and scattering through the core 600 as the light travels from the light receiving edge 510 to the display 408. For example, the greater the transmissibility factor, the greater the amount of light that may escape through (e.g., the second face 605) the core 600 than an amount of light traveling to the face 402. On the contrary, the smaller the transmissibility factor, the light scatters within the core 600 and less light escapes through the second face 605 and directed toward the face 402. The refractive index is a measure of how much light is bent (or refracted) as it passes through a core 600, which enables the light to travel from the light receiving edge 508 to the face 402. For example, an optical quality acrylic plastic can be at least 92% transmissive, where a perfectly opaque material can be 0% transmissive. A typical index value for clear acrylic is 1.49, whereas for clear polycarbonate 1.57 is common.

Figure 6A:
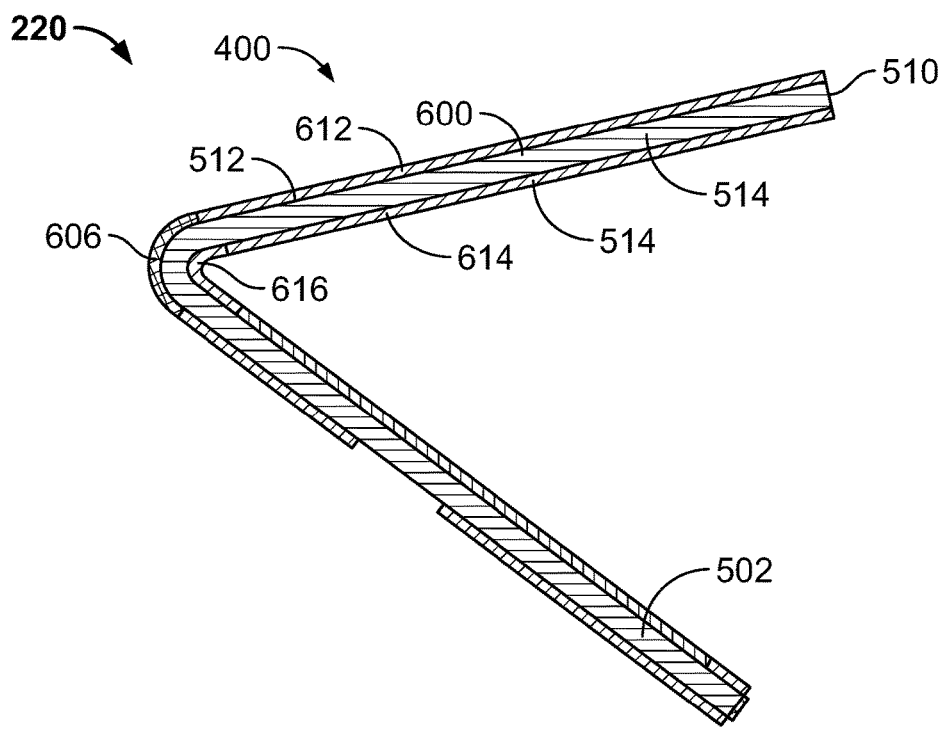
FIG. 6A is cross-sectional view of the wayfinding apparatus of FIGS. 2-5 having an additional layer material.

During operation, when light enters the light receiving edge 510, light strikes the core 600 at an angle greater than a critical angle, which causes the light to reflect back inside the core 600 rather than passing out or through the core 600 and through the outer surface 512 and/or the inner surface 514. The light travels or propagates through the second leg 504 toward the transition 506. In some examples, as shown in FIG. 6A, the second leg 504 can include the mask 612 on the outer surface 512 and the mask 614 on the inner surface 514 to propagate the light towards the transition 506.

The transition deflects or reflects the light from the core 600 of the second leg 504 toward the core 600 of the first leg 502. The reflective layer 606 provides a mirror effect to direct the light towards the first leg 502. In the illustrated example, the reflective layer 606 and/or the transition 506 redirects or diverts the light at an angle of between approximately seventy degrees and ninety degrees. Thus, the transition 506 and/or the reflective layer 606 redirect or divert the light propagating in a forward direction along the second leg 504 towards a rearward direction along the first leg 502. In other words, the transition 506 and/or the reflective layer 606 redirects the light from the light receiving edge 510 to the first edge 508.

As the light enters the core 600 of the first leg 502, the mask 602 prevents or restricts the light from exiting the portion 412 of the face 402. The frosted layer 610 diffuses the light adjacent the display 408. The diffused light exits the face 402 via the display 408 and illuminates the display 408. Diffusing the light via the frosted layer 610 provides a more even distribution of light through the display 408. In other words, an intensity of the light (e.g., lumens) exiting the display is substantially similar across an overall surface area of the display 408.

Figure 9A:
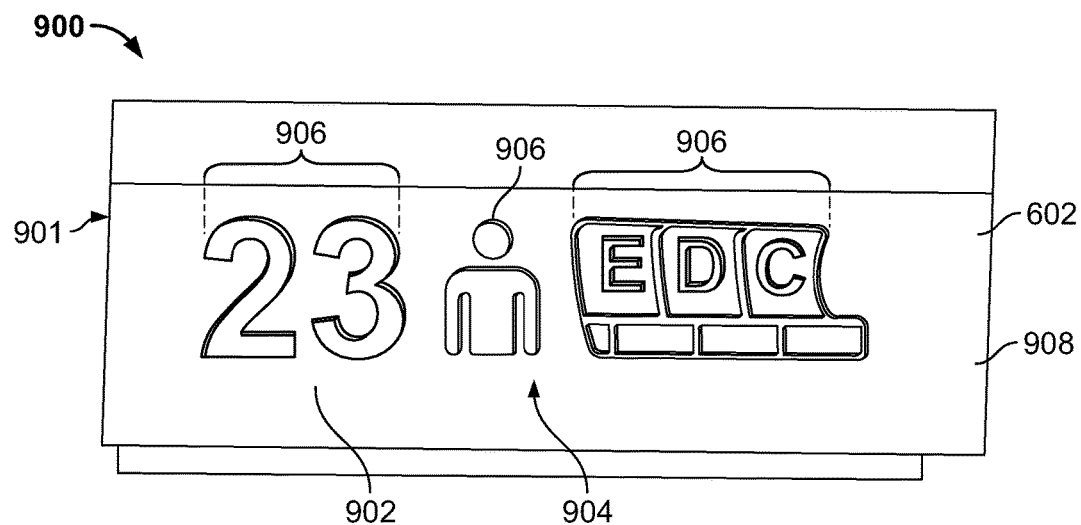
FIG. 9A is a front view of another wayfinding apparatus 900 disclosed herein.
Figure 9B:
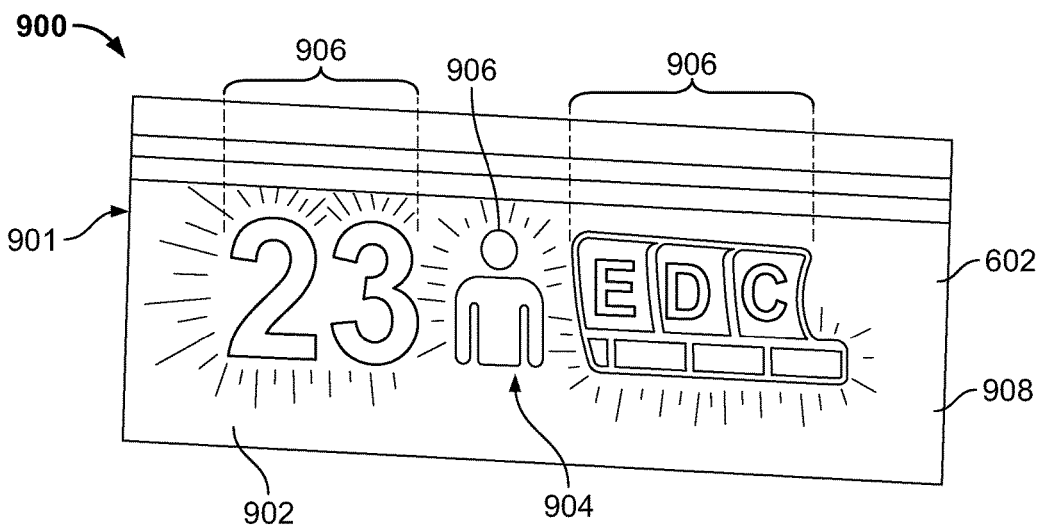
FIG. 9B is a front view of the wayfinding apparatus 900 of FIG. 9A in an illuminated condition.

FIG. 9A is a front view of another wayfinding apparatus 900 disclosed herein. FIG. 9B is a front view of the wayfinding apparatus 900 of FIG. 9A but shown in an illuminated condition. The wayfinding apparatus 900 is substantially similar to the wayfinding apparatus 220 of FIGS. 2-8. The wayfinding apparatus 900 includes a body 901 defining a face 902 that defines a display 904 to present indicia 906 (e.g., visual indicators). The display 904 is composed of light transmissive material(s) (e.g., acrylic). Unlike the indicia 410 of the display 408 of FIGS. 2-8, which are formed from an opaque material, the indicia 906 are composed of a light transmissive material(s). To this end, the indicia 906 define the display 904. A portion 908 of the face 902 surrounding a perimeter of the indicia 906 is composed of a non-transmissive material(s) (e.g., includes the mask 602 of FIG. 6). For example, the mask 602 surrounds the indicia 906 such that each of the indicia 906 is spaced or separated from another one of the indicia 906. In other words, the mask 602 provides or defines an outline (e.g., about a perimeter) of each indicium 906 to be illuminated. Thus, when the wayfinding apparatus 220 is illuminated, only the display 904 of the face 902 emits light (e.g., is illuminated). Light does not emit from the portion 908 of the face 902 surrounding respective perimeters of the indicia 906. In some examples, the display 408, the core 600, the face 402 and/or the indicia 410 of the example wayfinding apparatus 200 of FIGS. 2-8 can be implemented with the features (e.g., the display 904, the indicia, the face 902) of the wayfinding apparatus 900.

Figure 10:
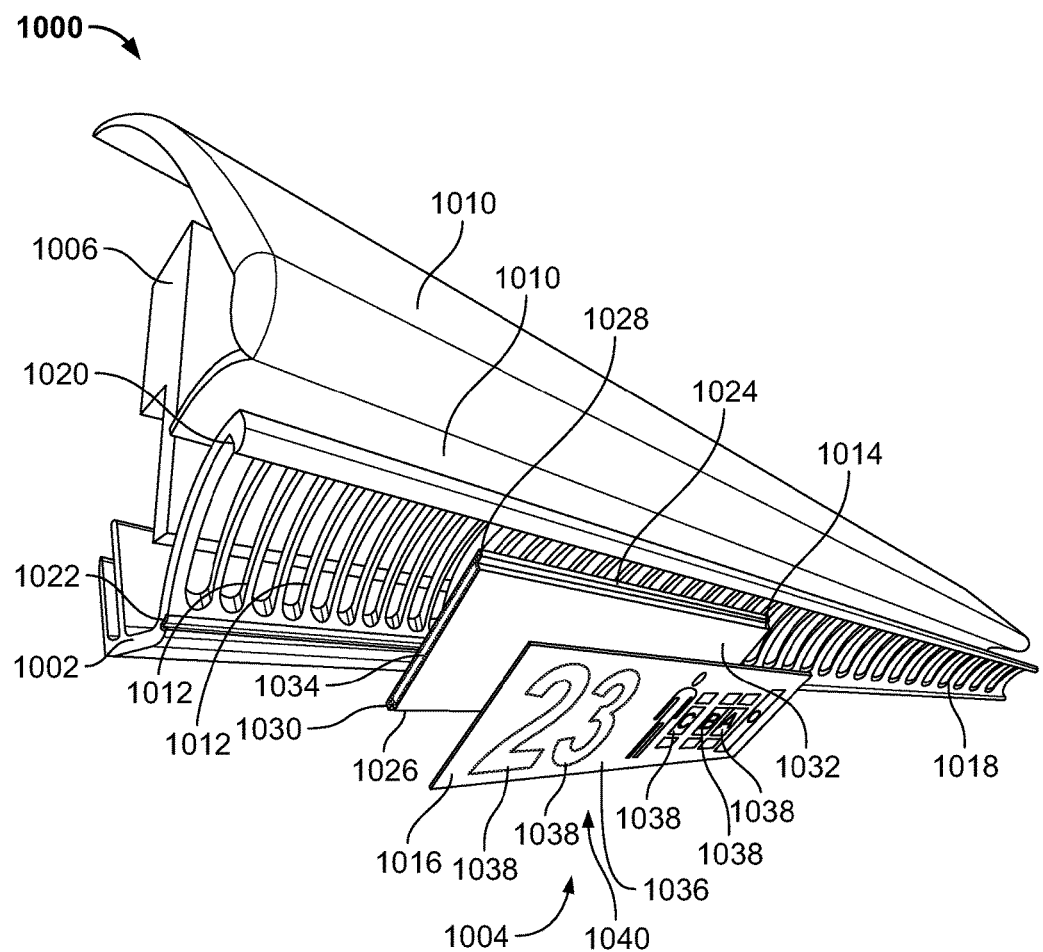
FIG. 10 illustrates another example wayfinding apparatus disclosed herein.

FIG. 10 illustrates another wayfinding apparatus 1000 disclosed herein. The wayfinding apparatus 1000 includes a rail 1002 that defines a portion of an overhead bin of an aircraft and a wayfinding coupon 1004. For example, the wayfinding apparatus 1000 can implement the first overhead bin 302 of the example aircraft 100 of FIGS. 1-3. The rail 1002 is positioned adjacent a light source 1006 of an aircraft cabin. A cover 1010 shields light from the light source 1006. The rail 1002 includes a plurality of openings 1012 to enable light to pass through the rail 1002. The openings 1012 are evenly spaced and distributed along an entire length of the rail 1002. In some examples, the openings 1012 can be distributed along a portion of the length of the rail 1002. For example, the openings 1012 can be located along a portion of the rail 1002 at which the wayfinding coupon 1004 is located or positioned.

The wayfinding coupon 1004 includes a diffusor 1014 and a stencil 1016. The diffusor 1014 provides a support or frame for the stencil 1016. Specifically, the diffusor 1014 couples the stencil 1016 to the rail 1002.

The wayfinding coupon 1004 couples to a front surface 1018 of the rail 1002 such that the rail 1002 is positioned between the wayfinding coupon 1004 and the light source 1006. To couple the wayfinding coupon 1004 to the rail 1002, the rail 1002 includes a first track 1020 and a second track 1022. The diffusor 1014 includes a first edge 1024 and a second edge 1026. The first edge 1024 includes a first step or shoulder to define a first lip 1028 and the second edge 1026 includes a second step or shoulder to define a second lip 1030. Thus, a first or front surface 1032 of the diffusor has a first length (e.g., a vertical length) and a second or rear surface 1034 of the diffusor has a second length (e.g., a vertical length) that is greater than the first length.

To couple the wayfinding coupon 1004 to the rail 1002, the first edge 1024 of the diffusor 1014 is aligned with (e.g., an opening of) the first track 1020 of the rail 1002 and the second edge 1026 of the diffusor 1014 is aligned with (e.g., an opening of) the second track 1022. The diffusor 1014 moves (e.g., slides) along a longitudinal length of the rail 1002 via the first track 1020 and the second track 1022. The first lip 1028 engages (e.g., a wall or surface of) the first track 1020 and the second lip 1030 engages (e.g., a wall or surface of) the second track 1022 to retain or couple the diffusor 1014 to the rail 1002. The wayfinding coupon 1004 can be positioned at any location along the length of the rail 1002. The stencil 1016 is coupled to the front surface 1032 of the diffusor 1014. For example, the stencil 1016 can be coupled or attached to the diffusor 1014 via adhesive and/or any other fastener. The stencil 1016 is composed of an opaque material 1036 and includes openings 1038 (e.g., cutouts) forming of indicia 1040. For example, the indicia 1040 include a row indicator and one or more seat indicators. During operation, light from the light source 1006 passes through the openings 1012 of the rail 1002. The diffusor 1014 diffuses the light as the light passes through the diffusor 1014 to more evenly distribute the light through the openings 1038 of the stencil 1016 to illuminate the wayfinding apparatus 1000.

Figure 11A:
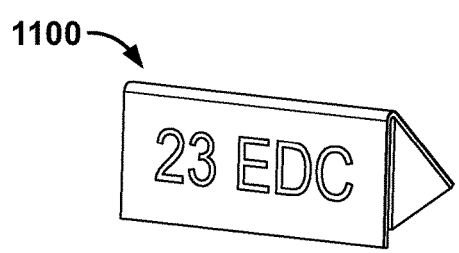
FIG. 11A is a perspective view of another example wayfinding apparatus disclosed herein.
Figure 11B:
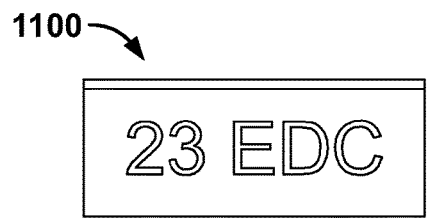
FIG. 11B is front side view of the example wayfinding apparatus of FIG. 11A.
Figure 11C:
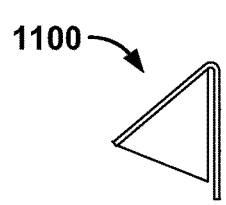
FIG. 11C is a left side view of the example wayfinding apparatus of FIG. 11A.
Figure 11D:
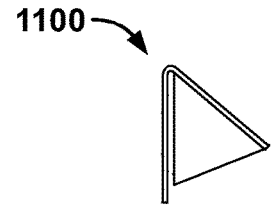
FIG. 11D is right side view of the example wayfinding apparatus of FIG. 11A.
Figure 11E:
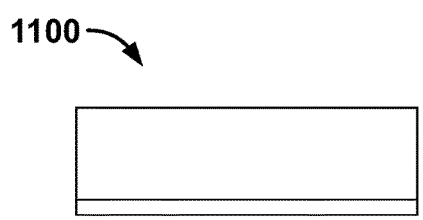
FIG. 11E is top side view of the example wayfinding apparatus of FIG. 11A.
Figure 11F:
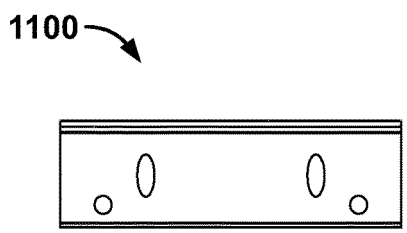
FIG. 11F is a bottom side view of the example wayfinding apparatus of FIG. 11A.
Figure 11G:
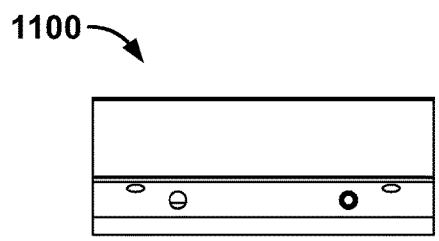
FIG. 11G is a rear side view of the example wayfinding apparatus of FIG. 11A.

FIG. 11A is a perspective view of another example wayfinding apparatus 1100 disclosed herein. FIG. 11B is front side view of the example wayfinding apparatus of FIG. 11A. FIG. 11C is a left side view of the example wayfinding apparatus of FIG. 11A. FIG. 11D is right side view of the example wayfinding apparatus of FIG. 11A. FIG. 11E is top side view of the example wayfinding apparatus of FIG. 11A. FIG. 11F is a bottom side view of the example wayfinding apparatus of FIG. 11A. FIG. 11G is a rear side view of the example wayfinding apparatus of FIG. 11A.

The following paragraphs provide various examples of the example wayfinding apparatus disclosed herein.

A wayfinding apparatus can have a core composed of a light transmissive material. The core has: a first surface defining a first face; a second surface defining a second face, the second face being oriented non-parallel relative to the first surface such that a second edge of the core is in (e.g., faces) a rearward direction relative to the first face; and a transition positioned between the first surface and the second surface, the transition to optically couple the second edge and the first face.

Other examples can include the wayfinding apparatus of described above, wherein the transition is a curved surface.

Other examples can include the wayfinding apparatus of any one of the above examples, wherein the first face and the second face are spaced by an angle of approximately between 280 and 330 degrees.

Other examples can include the wayfinding apparatus of any one of the above-example, wherein the transition defines a corner of the core.

Some examples can include the wayfinding apparatus of any one of the above examples, wherein the core defines a V-shaped profile.

Other examples can include the wayfinding apparatus of any one of the above examples, wherein the second edge is to receive light and the transition is to reflect the light received from the second edge towards the first edge.

Other examples can include the wayfinding apparatus of any one of the above examples, wherein the first face defines a display to allow light redirected by the transition to exit the first face.

Other examples can include the wayfinding apparatus of any one of the above examples, wherein the first face includes a mask positioned around the display, the mask to prevent the light from exiting the first face.

Other examples can include the wayfinding apparatus of any one of the above examples, wherein the transition includes a reflective layer.

Other examples can include the wayfinding apparatus of any one of the above examples, wherein the reflective layer is oriented toward the first edge and the second edge.

A wayfinding apparatus can include a body defining an outer surface and an inner surface. The body has a first leg defining a face to present indicia. A second leg defines a light receiving edge oriented in a rearward direction relative to the face, where the light receiving edge to receive light from a light source to illuminate the indicia of the face. A transition is to couple the first leg and the second leg, the transition to direct light from the second leg to the first leg.

Other examples can include the wayfinding apparatus of the above examples, further including a mask positioned on the outer surface of the face and around the indicia, the mask composed of an opaque material.

Other examples can include the wayfinding apparatus of any one of the above examples, wherein the first leg, the second leg and the transition are a unitary structure defining a light guide, the light guide to propagate light between the light receiving edge and the face.

Other examples can include the wayfinding apparatus of any one of the above examples, further including a frosted layer positioned on the inner surface of the first leg of the body, the frosted layer to extend adjacent the face.

Other examples can include the wayfinding apparatus of any one of the above examples, further including a reflective layer positioned on the transition.

Other examples can include the wayfinding apparatus of any one of the above examples, wherein the transition and the reflective layer are to redirect light propagating in a first direction along the second leg in a second direction along the first leg.

A wayfinding apparatus includes a rail having a first track and a second track. A diffusor has a first lip at a first edge of the diffusor and a second lip at a second edge of the diffusor. The first lip is to engage the first track and the second lip to engage the second track to couple the diffusor to the rail. A stencil coupled to a front surface of the diffusor, where the stencil being positioned between the first lip and the second lip.

Other examples can include the wayfinding apparatus of the above examples, wherein the rail includes a plurality of openings to enable light to pass through the rail to the diffusor.

Other examples can include the wayfinding apparatus of any one of the above examples, wherein the stencil includes one or more openings to allow light to pass through the stencil when light passes through the diffusor via the openings of the rail.

Other examples can include the wayfinding apparatus of any one of the above examples, wherein the rail defines a portion of an overhead bin of an aircraft.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An aircraft comprising:
    a plurality of overhead bins;
    a light source to extend along a longitudinal length of the aircraft adjacent the overhead bins; and
    a wayfinding apparatus coupled to a respective one of the overhead bins, the wayfinding apparatus including:
        a core composed of a light transmissive material, the core having:
            a first surface defining a first face;
            a second surface defining a second face, the second face being oriented non-parallel relative to the first surface such that a second edge of the core is in a rearward direction relative to the first face; and
            a transition positioned between the first surface and the second surface, the transition to optically couple the second edge and the first face, the transition having a curved surface to enable the first surface of the core to be positioned along a first edge of the overhead bin of the aircraft oriented toward a seat of the aircraft and the second surface to be oriented in a direction toward the light source.

2. The aircraft of claim 1, wherein the first face and the second face are spaced by an angle of approximately between 280 and 330 degrees.

3. The aircraft of claim 1, wherein the transition defines a corner of the core.

4. The aircraft of claim 1, wherein the core defines a V-shaped profile.

5. The aircraft of claim 1, wherein the second edge is to receive light and the transition is to reflect the light received from the second edge towards the first edge.

6. The aircraft of claim 1, wherein the first face defines a display to allow light redirected by the transition to exit the first face.

7. The aircraft of claim 6, wherein the first face includes a mask positioned around the display, the mask to prevent the light from exiting the first face.

8. The aircraft of claim 1, wherein the transition includes a reflective layer.

9. The aircraft of claim 8, wherein the reflective layer is oriented toward the first edge and the second edge.

10. An aircraft comprising:
    a plurality of overhead bins;
    a light source to extend along a longitudinal length of the aircraft adjacent the plurality of overhead bins; and
    a wayfinding apparatus coupled to a respective one of the overhead bins, the wayfinding apparatus including:
        a body defining an outer surface and an inner surface, the body having:
            a first leg defining a face to present indicia to be oriented toward an aisle of the aircraft;
            a second leg defining a light receiving edge oriented in a rearward direction relative to the face and toward the light source to receive light from the light source to illuminate the indicia of the face; and
            a transition to couple the first leg and the second leg, the transition to direct light from the second leg to the first leg, the transition having a radius of curvature between approximately 0.375 inches and 0.5 inches to enable the body to be positioned over an edge of a cover associated with the respective one of the overhead bins.

11. The aircraft of claim 10, further including a mask positioned on the outer surface of the face and around the indicia, the mask composed of an opaque material.

12. The aircraft of claim 10, wherein the first leg, the second leg and the transition are a unitary structure defining a light guide, the light guide to propagate light between the light receiving edge and the face.

13. The aircraft of claim 10, further including a frosted layer positioned on the inner surface of the first leg of the body, the frosted layer to extend adjacent the face.

14. The aircraft of claim 10, further including a reflective layer positioned on the transition.

15. The aircraft of claim 14, wherein the transition and the reflective layer are to redirect light propagating in a first direction along the second leg in a second direction along the first leg.

16. An aircraft comprising:
a wayfinding apparatus to couple to an overhead bin, the wayfinding apparatus including:
a body defining an outer surface and an inner surface, the body having:
a first leg defining a face to present indicia and oriented toward an aisle of the aircraft;
a second leg defining a light receiving edge to receive light from a light source to illuminate the indicia of the face; and
a transition having an arcuate shape to couple the first leg and the second leg;
a reflective material positioned on an outer surface of the arcuate surface of the transition, the reflective material to direct light propagating in the second leg toward the first leg, the reflective material to extend from a first end of the first leg adjacent a first end of the transition to a second end of the second leg adjacent a second end of the transition; and
a mounting block to couple the wayfinding apparatus to the overhead bin.

17. The aircraft of claim 16, wherein the first leg and the second leg have substantially the same lengths.

18. The aircraft of claim 16, wherein the first leg and the second leg define a V-shaped profile.

19. The aircraft of claim 16, wherein the arcuate shape of the transition is to enable the wayfinding apparatus to be positioned around an edge of a cover associated with the overhead bin.

20. The aircraft of claim 16, wherein an angle between a longitudinal axis of the first leg and a longitudinal axis of the second leg is approximately between 10 degrees and 30 degrees.

* * * * *